(12) United States Patent
Tamura et al.

(10) Patent No.: US 9,981,331 B2
(45) Date of Patent: May 29, 2018

(54) ELECTROCHEMICAL MACHINING TOOL AND ELECTROCHEMICAL MACHINING SYSTEM

(71) Applicant: MITSUBISHI HEAVY INDUSTRIES, LTD., Tokyo (JP)

(72) Inventors: Kazuhisa Tamura, Tokyo (JP); Yosuke Mukai, Tokyo (JP); Shin Asano, Tokyo (JP); Tetsuhei Kobayashi, Tokyo (JP); Tomofumi Shintani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 473 days.

(21) Appl. No.: 14/780,637

(22) PCT Filed: Feb. 14, 2014

(86) PCT No.: PCT/JP2014/053466
§ 371 (c)(1),
(2) Date: Sep. 28, 2015

(87) PCT Pub. No.: WO2014/185106
PCT Pub. Date: Nov. 20, 2014

(65) Prior Publication Data
US 2016/0303673 A1    Oct. 20, 2016

(30) Foreign Application Priority Data

May 16, 2013    (JP) .................................. 2013-104392

(51) Int. Cl.
*B23H 3/04*     (2006.01)
*B23H 9/14*     (2006.01)
(Continued)

(52) U.S. Cl.
CPC ................ *B23H 3/00* (2013.01); *A47J 17/02* (2013.01); *A47J 43/288* (2013.01); *B23H 3/04* (2013.01);
(Continued)

(58) Field of Classification Search
CPC ............... B23H 3/04; B23H 9/14; B23H 9/16
See application file for complete search history.

(56) References Cited

U.S. PATENT DOCUMENTS

| 5,059,289 A | 10/1991 | Gaskell |
| 2009/0134136 A1 | 5/2009 | Graichen |

(Continued)

FOREIGN PATENT DOCUMENTS

| GB | 1130561 | 10/1968 |
| JP | 50-33025 | 10/1975 |

(Continued)

OTHER PUBLICATIONS

International Search Report dated Mar. 25, 2014 in corresponding International Application No. PCT/JP2014/053466.

(Continued)

*Primary Examiner* — Nicholas A Smith
(74) *Attorney, Agent, or Firm* — Wenderoth, Lind & Ponack, L.L.P.

(57) ABSTRACT

In order to easily form curved holes and straight holes of desired shapes, an electrochemical machining tool of the present invention comprises a tool body including: an electrode made from an electrically conductive material in a cylindrical shape extending along an axial line and having flexibility, an electrolytic solution flowing through an internal flow channel of the electrode toward a tip side; and an insulating layer coated on an outer circumferential face of the electrode so as to expose the tip of the electrode. A fluid outflow hole is formed in the tool body, passing through the (Continued)

tool body in a radial direction and guiding the electrolytic solution flowing through the flow channel outward in the radial direction, and the electrochemical machining tool further comprises a tube-shaped member selectively opening and closing the fluid outflow hole.

11 Claims, 14 Drawing Sheets

(51) Int. Cl.
　　　*B23H 9/16*　　　(2006.01)
　　　*B23H 3/00*　　　(2006.01)
　　　*A47J 17/02*　　　(2006.01)
　　　*A47J 43/28*　　　(2006.01)
　　　*B26D 3/08*　　　(2006.01)
　　　*B23H 3/10*　　　(2006.01)
　　　*B26D 1/00*　　　(2006.01)

(52) U.S. Cl.
　　　CPC .................. *B23H 3/10* (2013.01); *B23H 9/14* (2013.01); *B23H 9/16* (2013.01); *B26D 3/08* (2013.01); *B26D 2001/0033* (2013.01); *B26D 2001/0053* (2013.01)

(56) References Cited

U.S. PATENT DOCUMENTS

| | | |
|---|---|---|
| 2011/0070096 A1 | 3/2011 | Wei et al. |
| 2015/0231717 A1 | 8/2015 | Tamura et al. |

FOREIGN PATENT DOCUMENTS

| | | |
|---|---|---|
| JP | 7-51948 | 2/1995 |
| JP | 2003-507197 | 2/2003 |
| JP | 2011-62811 | 3/2011 |
| JP | 2011-177819 | 9/2011 |
| JP | 2012-35369 | 2/2012 |
| WO | 2013/081000 | 6/2013 |

OTHER PUBLICATIONS

Written Opinion of the International Searching Authority dated Mar. 25, 2014 in corresponding International Application No. PCT/JP2014/053466.

Notice of Allowance dated Sep. 13, 2016 in corresponding KR Application No. 10-2015-7025146, with English Translation.

Notice of Allowance dated Aug. 16, 2016 in corresponding Japanese Application No. 2013-104392.

ELECTROCHEMICAL MACHINING TOOL AND ELECTROCHEMICAL MACHINING SYSTEM

TECHNICAL FIELD

The present invention relates to an electrochemical machining tool electrolytically machining a machined material by passing electricity through an electrolytic solution between an electrode and the machined material, and to an electrochemical machining system equipped with the electrochemical machining tool.

This application claims priority based on Japanese Patent Application No. 2013-104392, filed on May 16, 2013, the contents of which are incorporated herein by reference.

BACKGROUND ART

Perforation machining of a material for which mechanical machining is difficult is typically performed using an electrolytic machining method, a discharge machining method, or similar. Using an electrolytic machining method is especially preferable for performing perforation machining of such a material having a high aspect ratio.

Incidentally, for example, a cooling hole for passing a coolant medium to cool a turbine blade is formed in the turbine blade of a gas turbine. Then, in order to realize a design that is thermally and aerodynamically optimized, that is, in order to efficiently cool a portion, such as a blade profile, a platform, and the like, that reaches high temperatures, the shape of the cooling hole preferably curves along a geometric shape of the turbine blade.

Here, for example, Patent Document 1 discloses an assembly using an electrochemical machining method enabling the formation of a curved hole in a machined product by using a curved electrode.

CITATION LIST

Patent Literature(s)

Patent Document 1: Japanese Unexamined Patent Application Publication No. 2011-62811A

SUMMARY OF INVENTION

Technical Problem

However, the device described in Patent Document 1 is unable to machine a curved hole and a straight hole together, using the same electrode, given that machining is performed using a curved electrode. Particularly, in a situation where a cooling hole is machined along a blade profile surface, machining is required that varies the curvature of the curved holes, that combines curved holes and straight holes, and the like.

The present invention provides an electrochemical machining tool, an electrochemical machining system, and a manufacturing method for a perforated member that enable curved holes and straight holes to be easily formed in a desired shape.

Solution to Problem

An electrochemical machining tool according to a first aspect of the present invention includes a tool body including: an electrode made from an electrically conductive material in a cylindrical shape extending along an axial line and having flexibility, an electrolytic solution flowing therein toward a tip side; and an insulating layer coated on an outer circumferential face of the electrode so as to expose the tip of the electrode. Also, a fluid outflow hole is formed in the tool body, passing through the tool body in a radial direction and guiding the electrolytic solution flowing in the electrode outward in the radial direction. The electrochemical machining tool further includes a shielded portion selectively opening and closing the fluid outflow hole.

In this electrochemical machining tool, the electrolytic solution flows through the flow channel in the electrode and is guided out from the tip of the tool body. Then, electricity is passed through the electrolytic solution between the tip surface of the electrode and an inner face of a machine hole in a machined material. As such, the machined material is electrolyzed and the machined hole is more deeply machined. In addition, the electrolytic solution is guided outward from the fluid outflow hole in the radial direction. The electrolytic solution that has flowed out applies a fluid force to the inner face of the machined hole. As such, a reaction force is applied to the tool body, such that the tool body is deformed to deflect in the direction of the reaction force.

The shielded portion is able to selectively open and close the fluid outflow hole. As such, while the fluid outflow hole is opened, the electrolytic solution flowing out from the fluid outflow hole causes deflection deformation of the tool body, which enables the machined hole to be machined while the electric current density distribution is skewed in the direction of the tool body deflection. Conversely, while the fluid outflow hole is closed, the tool is not deformed and maintains a straight shape. As such, this enables the machined hole to be machined without the electric current density distribution being skewed.

According to an electrochemical machining tool according to a second embodiment of the present invention, the shielded portion of the above-described first aspect may be a tube-shaped member having a tube shape extending along the axial line and having flexibility. The tube-shaped member is provided so as to be capable of relative displacement in the direction of the axial line with respect to the electrode while an outer circumferential surface of the shielded portion is in a state of contact with an inner circumferential surface of the electrode.

Given that the shielded portion is such a tube-shaped member, the fluid outflow hole may be opened and closed by the outer circumferential surface of the tube-shaped member by displacement of the tube-shaped member. Accordingly, this enables the deflection deformation of the tool body to be easily controlled.

According to an electrochemical machining tool according to a third aspect of the present invention, the fluid outflow hole may be formed in plurality on the tool body of the above-described second aspect, with spacing in the direction of the axial line.

Forming the fluid outflow hole in plurality along the direction of the axial line enables the outflow volume of the electrolytic solution to be adjusted by modifying a number of fluid outflow holes that are closed. As such, the reaction force applied to the tool body from the inner face of the machined hole is adjusted, thereby enabling the amount of deflection deformation of the tool body to be modified. Accordingly, this enables the machined hole to be easily formed in a further complex shape.

According to an electrochemical machining tool according to a fourth aspect of the present invention, the shielded portion of the above-described first aspect may be a tube-shaped member having a tube shape extending along the axial line and having flexibility. The tube-shaped member is provided so as to be capable of relative rotation about the axial line with respect to the electrode while an outer circumferential surface of the shielded portion is in a state of contact with an inner circumferential surface of the electrode. Also, a through-hole is formed in the tube-shaped member at the same position as the fluid outflow hole in the direction of the axial line, passing through in the radial direction.

Given that the shielded portion is a tube-shaped member, the through-hole and the fluid outflow hole may be made continuous by rotation of the tube-shaped member. Accordingly, the fluid outflow hole may be opened and closed, which enables the deflection deformation of the tool body to be easily controlled.

According to an electrochemical machining tool according to a fifth aspect of the present invention, the fluid outflow hole may be formed in plurality on the tool body of the above-described fourth aspect, with spacing in a circumferential direction of the tool body.

Forming the fluid outflow hole in plurality along the circumferential direction enables the outflow direction of the electrolytic solution to be adjusted by selecting a fluid outflow hole that is closed. As such, the direction of the reaction force applied to the tool body from the inner face of the machined hole is adjusted, thereby enabling the direction of deflection deformation of the tool body to be modified. Accordingly, the machined hole may be easily formed in a more complex shape.

According to an electrochemical machining tool according to a sixth aspect of the present invention, the shielded portion of the above-described fourth and fifth aspects may be provided so as to be capable of relative displacement in the direction of the axial line with respect to the electrode.

The closed surface area of an aperture portion of the fluid outflow hole is made adjustable by displacing the shielded portion in the direction of the axial line. As such, the outflow volume of the electrolyte solution may be adjusted. As a result, the amount of deflection deformation of the tool body may be modified, thereby enabling the machined hole to be easily formed in a desired shape of a curved hole.

According to an electrochemical machining tool according to a seventh aspect of the present invention, the fluid outflow hole may be formed in plurality on the tool body of the above-described sixth aspect, with spacing in the direction of the axial line.

Forming the fluid outflow hole in plurality along the direction of the axial line enables the outflow volume of the electrolytic solution to be adjusted by modifying a number of fluid outflow holes that are closed. As a result, the amount of deflection deformation of the tool body may be modified. Accordingly, this enables the machined hole to be easily formed in a complex shape.

Furthermore, the outflow direction and the outflow volume of the electrolytic solution may both be adjusted by displacing the tube-shaped member in the direction of the axial line while rotating. As a result, the machined hole may be easily formed as a curved hole having a further complex shape.

According to an electrochemical machining tool according to an eighth aspect of the present invention, the shielded portion of the above-described first aspect may be a lid member provided on an outer circumferential side of the tool body, and opens and closes the fluid outflow hole.

Given that the shielded portion is the lid member, the fluid outflow hole may be opened and closed by opening and closing the lid member. As such, the deflection deformation of the tool body may be easily controlled.

An electrochemical machining system according to a ninth aspect of the present invention includes the electrochemical machining tool according to any one of the above-described first to eighth aspects, a guide guiding the electrochemical machining tool in a predetermined advancement direction with respect to a machined material, a tool displacement mechanism causing the electrochemical machining tool to advance, and a shielded portion drive mechanism operating the shielded portion to open and close the fluid outflow hole.

In this electrochemical machining system, the fluid outflow hole may be selectively opened and closed by the shielded portion of the electrochemical machining tool being operated by the shielded portion drive mechanism. Then, while the fluid outflow hole is opened, the electrolytic solution flowing out from the fluid outflow hole causes deflection deformation of the tool body, which enables the machined hole to be machined while the electric current density distribution is skewed in the direction of the tool body deflection. Conversely, while the fluid outflow hole is closed, the tool is not deformed and maintains a straight shape. As such, this enables the machined hole to be machined without the electric current density distribution being skewed.

Advantageous Effects of Invention

According to the above-described electrochemical machining tool and electrochemical machining system, a fluid outflow hole is opened and closed using a shielded portion. As such, a machined hole may easily be formed in a desired shape of a curved hole and a straight hole.

BRIEF DESCRIPTION OF DRAWING(S)

DESCRIPTION OF EMBODIMENTS

First Embodiment

An electrochemical machining system 1 according to a first embodiment of the present invention is described below.

The electrochemical machining system 1 is a device forming a machined hole 101 in a machined material 100. As an example, in the present embodiment, the machined material 100 is a turbine blade of a gas turbine. The machined hole 101 in the machined material 100 is a cooling hole for cooling the turbine blade.

Figure 1:
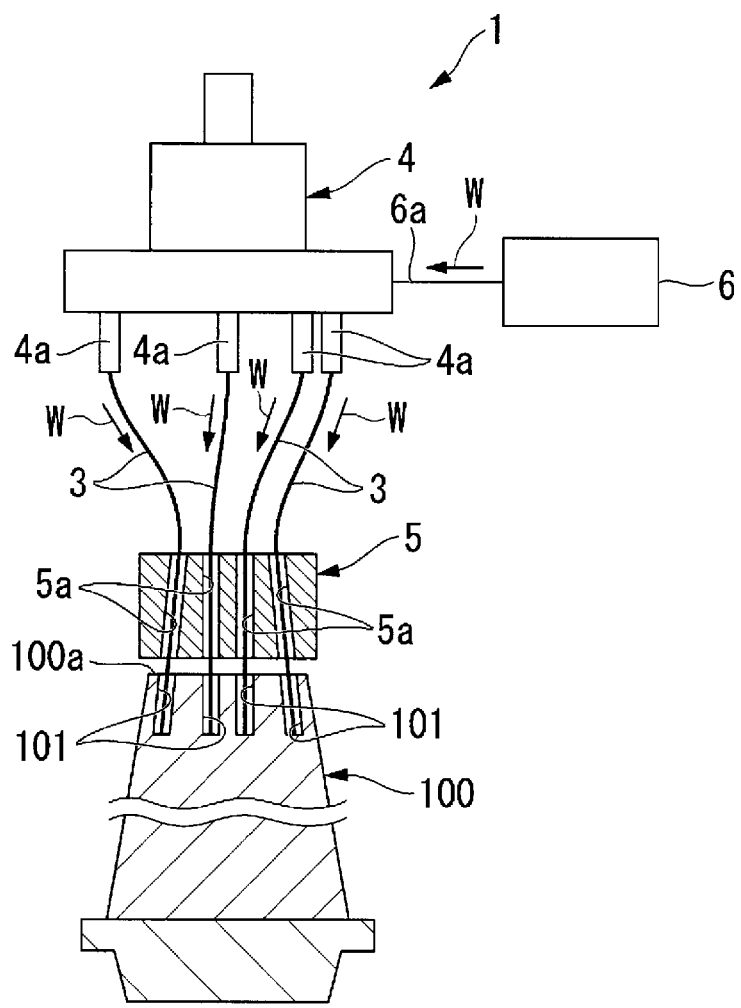
FIG. 1 is a front view illustrating an electrochemical machining system according to a first embodiment of the present invention.
Figure 2A:
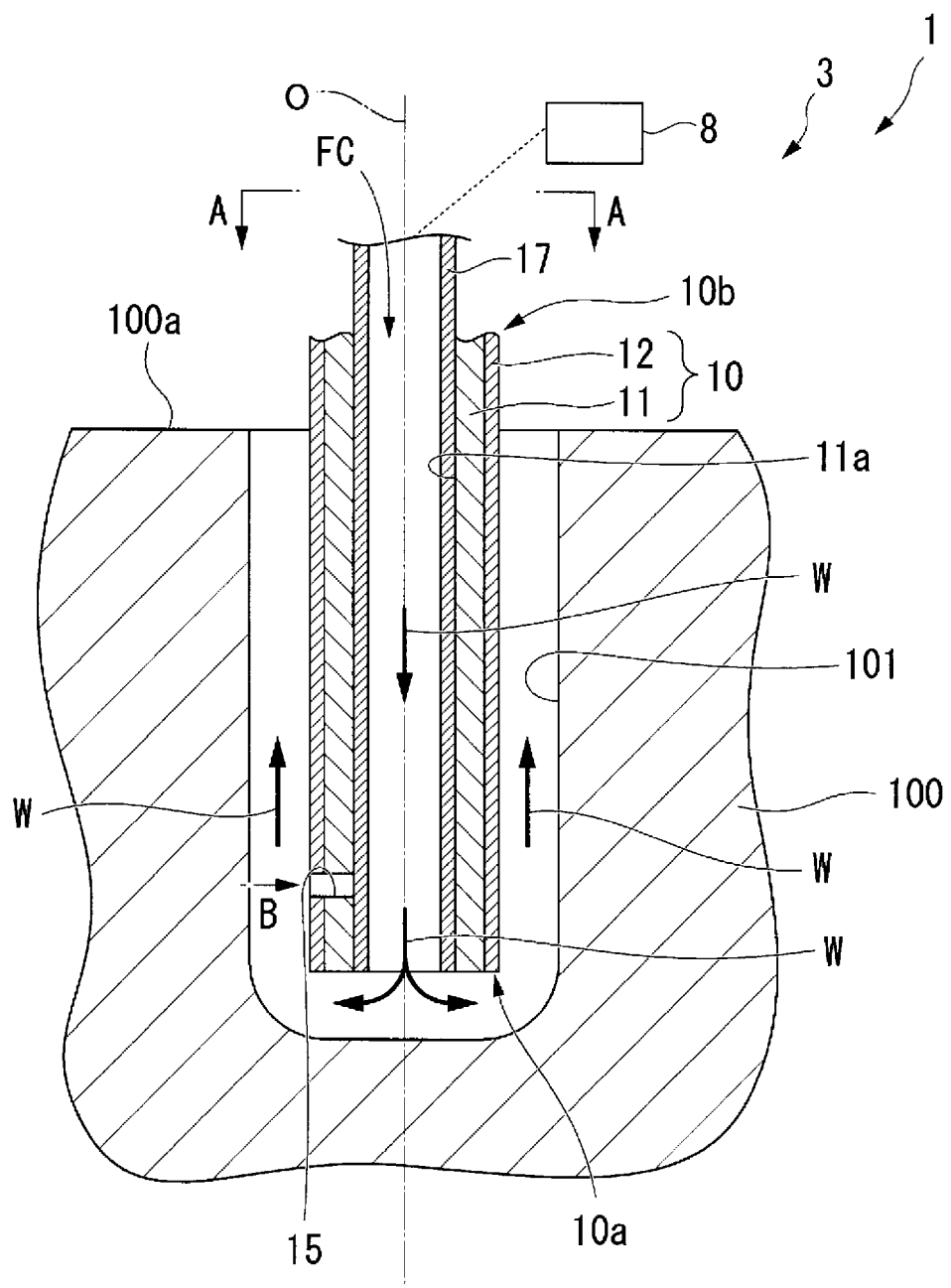
FIG. 2A is a vertical cross-sectional view illustrating an electrochemical machining tool and a machined material in the electrochemical machining system according to the first embodiment of the present invention, while a fluid outflow hole is closed.
Figure 2B:
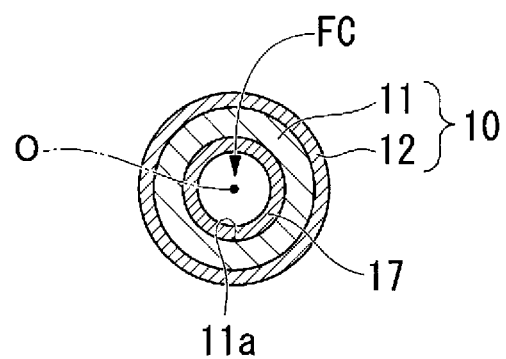
FIG. 2B is a cross-sectional view taken along line A-A of FIG. 2A, illustrating the closed fluid outflow hole in the electrochemical machining system according to the first embodiment of the present invention.
Figure 2C:
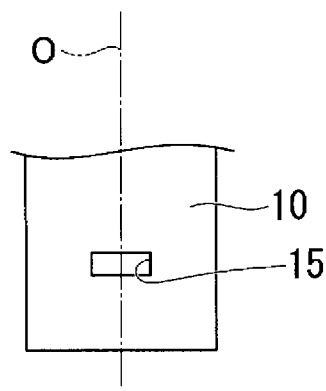
FIG. 2C is an arrow B view of FIG. 2A, illustrating the closed fluid outflow hole in the electrochemical machining system according to the first embodiment of the present invention.

As illustrated in FIG. 1, the electrochemical machining system 1 includes a plurality of electrochemical machining tools 3 forming the machined hole 101 in the machined material 100, a tool displacement mechanism 4 causing the electrochemical machining tools 3 to advance, a guide 5 guiding the electrochemical machining tools 3 during advancement of the electrochemical machining tools 3, and an electrolytic solution supplier 6 supplying an electrolytic solution W to the electrochemical machining tools 3 (see FIGS. 2A, 2B, and 2C). The electrochemical machining system 1 may be configured not only to include the plurality of electrochemical machining tools 3, but may also be configured to include a single electrochemical machining tool 3.

The tool displacement mechanism 4 causes the electrochemical machining tools 3 to advance and retreat with respect to the machined material 100. Also, the tool displacement mechanism 4 of the present embodiment is disposed at a tip 100a side of the turbine blade, which is the machined material 100, and is configured to be displaceable forward and backward with respect to the tip 100a.

As such, the tool displacement mechanism 4 performs forward and backward displacement of the electrochemical machining tools 3 using a drive power supply that is, for example, an electric motor or the like, and is not illustrated in the drawings.

The tool displacement mechanism 4 has a plurality of grippers 4a on a face of the machined material 100 side, each gripping a base end of a respective electrochemical machining tool 3. Each of the grippers 4a has a cylindrical shape with a hollow interior. Each gripper 4a is able to grip the respective electrochemical machining tool 3 by the base end of the electrochemical machining tool 3 being inserted into one end of the gripper 4a.

The electrolytic solution supplier 6 is a pump or the like connected to another end side of the tool displacement mechanism 4 than the grippers 4a via an electrolytic solution flow channel 6a. The electrolytic solution supplier 6 supplies the electrolytic solution W to the interior of the grippers 4a through the electrolytic solution flow channel 6a. The supplied volume of the electrolytic solution W is freely adjustable by a flow rate control device, which is not illustrated in the drawings. The electrolytic solution W may be, for example, sulfuric acid, nitric acid, a saline solution, or similar.

The guide 5 is disposed between the tool displacement mechanism 4 and the tip 100a of the machined material 100 (a tip shroud of the turbine blade). The guide 5 guides the electrochemical machining tools 3 being made to advance and retreat by the tool displacement mechanism 4 to follow a predetermined advancement direction with respect to the tip 100a of the machined material 100. The guide 5 is pierced by a plurality of guide holes 5a that continuously link a tool displacement mechanism 4 side and a machined material 100 side to each other. The electrochemical machining tools 3 respectively pass through each of the guide holes 5a from the tool displacement mechanism 4 side toward the machined material 100 side. The tool displacement mechanism 4 causes the electrochemical machining tools 3 to advance while in this state. As such, this enables the electrochemical machining tools 3 to be guided to a desired position on the tip 100a of the machined material 100 and a desired angle with respect to the tip 100a, in accordance with the position of the guide holes 5a.

The electrochemical machining tools 3 are described next.

As illustrated in FIG. 2A, FIG. 2B, and FIG. 2C, each of the electrochemical machining tools 3 forms a machined hole 101 in the machined material 100 by electrolytic machining. Each electrochemical machining tool 3 has an electrode 11 and an insulating layer 12 covering the electrode 11 from an outer circumference, and includes a tool body 10 having an overall shape that is cylindrical.

Each electrochemical machining tool 3 further includes a tube-shaped member 17 (shielded portion) arranged at the interior of the electrode 11.

The electrode 11 of the tool body 10 has a cylindrical shape extending along an axial line O. Also, the electrode 11 is formed from a conductive material that has flexibility, for example stainless steel, copper, titanium, and the like. A hollow portion of the interior of the electrode 11 (the electrode 11 interior) is formed with a space continuously connected to the hollow portion of one of the grippers 4a of the tool displacement mechanism 4. The space serves as a flow channel FC through which the electrolytic solution W supplied for electrolytic machining flows, guided by the hollow portion of the gripper 4a. Also, the electrolytic solution W flows through the flow channel FC from a base end 10b side, which is the rear end side of the tool body 10 (the tool displacement mechanism 4 side), toward the tip 10a side (the machined material 100 side).

In addition, an end face of the electrode 11 on the tip 10a side has one of a flat shape that is orthogonal to the axial line O, and a tapered shape (the flat shape applies in the present embodiment). In the present embodiment, the electrode 11 has a cylindrical shape. However, the electrode 11 may also be shaped as a polygonal tube with a polygonal cross-section, for example.

The insulating layer 12 in the tool body 10 is, for example, formed from a polyester resin having electrical insulation properties, or the like. The insulating layer 12 is coated on the outer circumferential surface of the electrode 11. An end face of the electrode 11 on the tip 10a side is not covered by the insulating layer 12, such that the electrode 11 is exposed.

The tool body 10 made from this electrode 11 and this insulating layer 12 also has a fluid outflow hole 15 formed in a portion of a circumferential direction position thereof. The fluid outflow hole 15 causes the electrolytic solution W flowing through the flow channel FC in the electrode 11 to flow out toward the outside in the radial direction of the tool body 10.

In the present embodiment, the fluid outflow hole 15 has a shape, as viewed from the radial direction of the tool body 10 and illustrated in FIG. 2C, that is rectangular with line segments extending along the circumferential direction and the axial line O as edges. The shape of the fluid outflow hole 15 is not limited to being rectangular. For example, the fluid outflow hole 15 may have some other shapes, such as being circular or square. In addition, the fluid outflow hole 15 is preferably formed at a position near the tip 10a of the tool body 10, as in the present embodiment. However, no limitation to this position is intended.

The tube-shaped member 17 has a tubular shape extending along the axial line O, similarly to the electrode 11. The tube-shaped member 17 is formed from a material having flexibility. This tube-shaped member 17 is provided inside the electrode 11, being co-axial with the electrode 11. The tube-shaped member 17 undergoes relative displacement with respect to the electrode 11 while sliding in the direction of the axial line O with an outer circumferential surface 17a of the tube-shaped member 17 being in a state of contact with the inner circumferential surface 11a of the electrode 11. The shape of this tube-shaped member 17 corresponds to the shape of the electrode 11 in a situation where, for example, the electrode 11 is shaped as a polygonal tube having a polygonal cross-section.

Here, an insulating material is preferably used for the tube-shaped member 17 so that a current-carrying surface area with respect to the machined material 100 does not vary.

Here, the electrochemical machining system 1 is equipped with a drive mechanism 8 (a shielded portion drive mechanism) gripping the tube-shaped member 17 from the base end 10b side of the tool body 10, and driving the tube-shaped member 17 in the direction of the axial line O. Due to this drive mechanism 8, the tube-shaped member 17 performs relative displacement with respect to the electrode 11 in the direction of the axial line O inside the electrode 11. As such, the above-described fluid outflow hole 15 is selectively opened and closed.

In this electrochemical machining system 1, the electrolytic solution W is made to flow through the flow channel FC in the electrode 11 and to flow out from the tip 10a of the tool body 10 by one of the electrochemical machining tools 3 having been used. Then, current is passed through the electrolytic solution W between the tip face of the electrode 11 and the inner face of the machined hole 101 of the machined material 100. As a result, the machined material 100 is electrolyzed and the machined hole 101 is more deeply machined.

Figure 3:
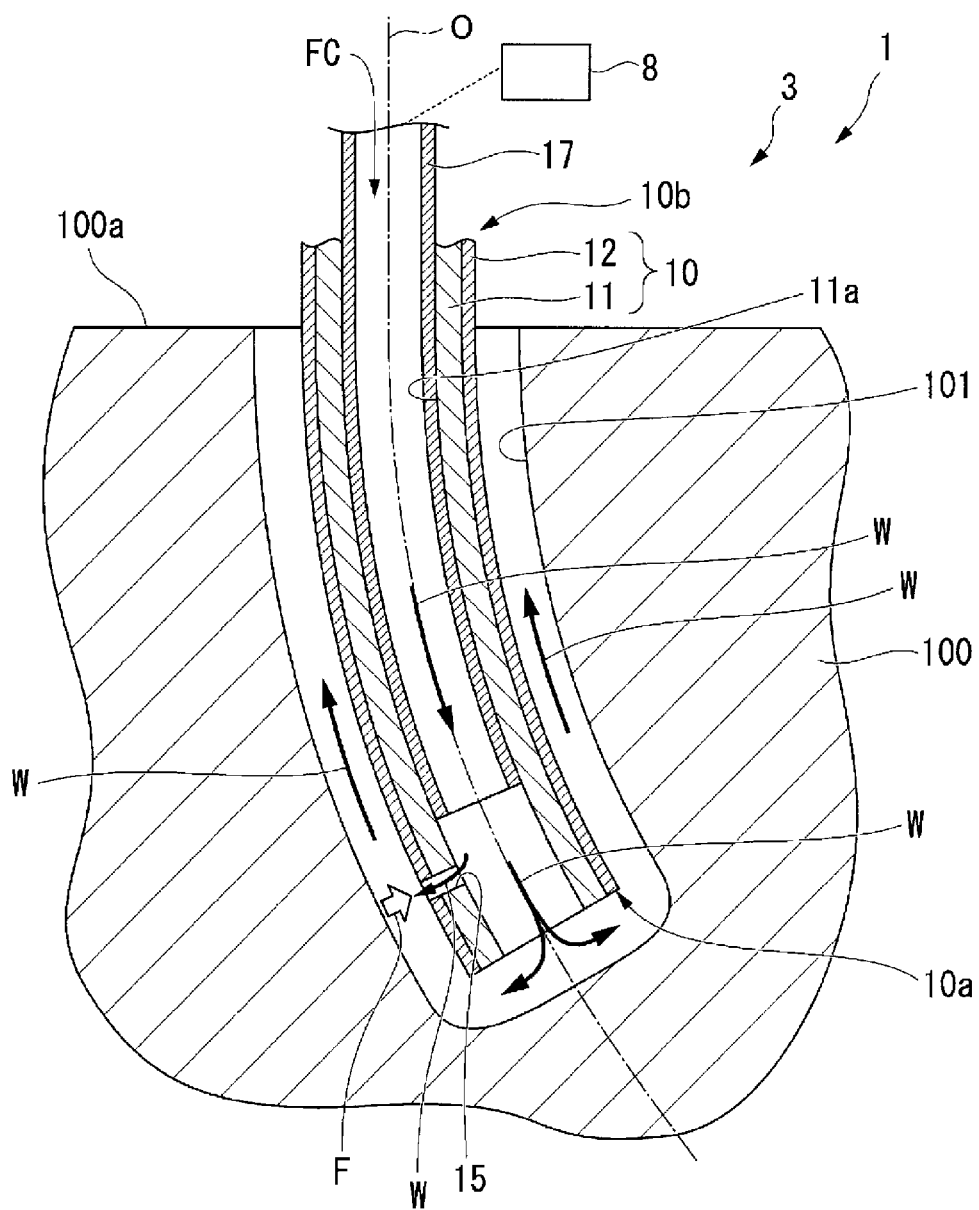
FIG. 3 is a vertical cross-sectional view illustrating the opened fluid outflow hole in the electrochemical machining system according to the first embodiment of the present invention.

Here, as illustrated in FIG. 3, the tube-shaped member 17 is displaced by the drive mechanism 8 along the direction of the axial line O toward the base end 10b side. As such, the outer circumferential surface 17a of the tube-shaped member 17 opens the fluid outflow hole 15. The electrolytic solution W flows out from the fluid outflow hole 15 toward the outer side in the radial direction. The electrolytic solution W that has flowed out applies a fluid force to the inner face of the machined hole 101. Therefore, a reaction force F is applied to the tool body 10, such that the tool body 10 is deformed so as to deflect in the direction of the reaction force F.

Conversely, as illustrated in FIG. 2A, the tube-shaped member 17 is displaced by the drive mechanism 8 in the direction of the axial line O toward the tip 10a side. As such, the outer circumferential surface 17a of the tube-shaped member 17 closes the fluid outflow hole 15 and stops the outward flow of the electrolytic solution W from the fluid outflow hole 15. As a result, the tool body 10 does not deflect. That is, the tool body 10 is able to remain in a straight shape.

Accordingly, the fluid outflow hole 15 may be selectively opened and closed by the tube-shaped member 17. As a result, the electric current density distribution is skewed toward the direction of deflection of the tool body 10 while the fluid outflow hole 15 is opened, thereby enabling the machined hole 101 to be machined. Conversely, the machined hole 101 may be machined without skewing the electric current density distribution while the fluid outflow hole 15 is closed.

Furthermore, the rigidity of the electrochemical machining tools 3 may be decreased at a position close to the tip 10a of the tool body 10 where the fluid outflow hole 15 is formed, while the tube-shaped member 17 is displaced toward the base end 10b side and the fluid outflow hole 15 is opened. As a result, the tool body 10 may be easily deformed, which enables reliability of the deflection deformation while suppressing the flow of the electrolytic solution W. Conversely, the rigidity of the electrochemical machining tools 3 may be increased at the position close to the tip 10a of the tool body 10 where the fluid outflow hole 15 is formed, while the tube-shaped member 17 is displaced toward the tip 10a side and the fluid outflow hole 15 is closed. As a result, vibrations of the tool body 10 may be suppressed and improvements to the straightness are made possible, thus enabling a reduction in the frequency of shorts.

According to the electrochemical machining system 1 of the present embodiment, the fluid outflow hole 15 is opened and closed by using the tube-shaped member 17. This enables the deflection deformation of the tool body 10 to be easily controlled. As a result, the electric current density distribution is adjusted, enabling easy formation of the machined hole 101 in a desired shape of a curved hole and a straight hole.

The tube-shaped member 17 need not be perfectly tubular. For example, the tube-shaped member 17 may be spatula shaped or the like, provided that the shape at least enables the fluid outflow hole 15 to be opened and closed.

The tube-shaped member 17 may also be provided on an outer side of the tool body 10 so as to cover the insulating layer 12 from the outer circumferential side. In such a situation, the tube-shaped member 17 opens and closes the fluid outflow hole 15 via the inner circumferential surface.

Figure 4:
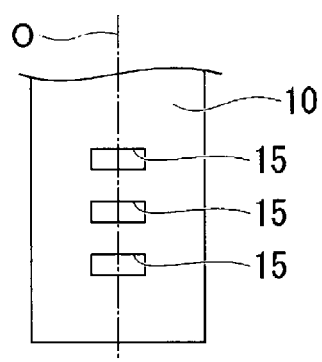
FIG. 4 is a view of the same position as FIG. 2C, illustrating the fluid outflow hole of a tool body in the electrochemical machining system according to a modified example of the first embodiment of the present invention.

As illustrated in FIG. 4, the fluid outflow hole 15 may also be formed in plurality, with spacing along the axial line O. In such a situation, the outflow volume of the electrolytic solution W may be adjusted by changing the number of the fluid outflow holes 15 that are closed. As such, the reaction force F applied to the tool body 10 from the inner face of the machined hole 101 is adjusted, thereby enabling the amount of deflection deformation of the tool body 10 to be modified. As a result, the machined hole 101 may be easily formed in a further complex shape.

Second Embodiment

An electrochemical machining system 21 according to a second embodiment of the present invention is described next.

Components common to the first embodiment are given the same reference signs, and detailed explanation thereof is omitted.

In the present embodiment, an electrochemical machining tool 23 differs from the first embodiment.

Figure 5A:
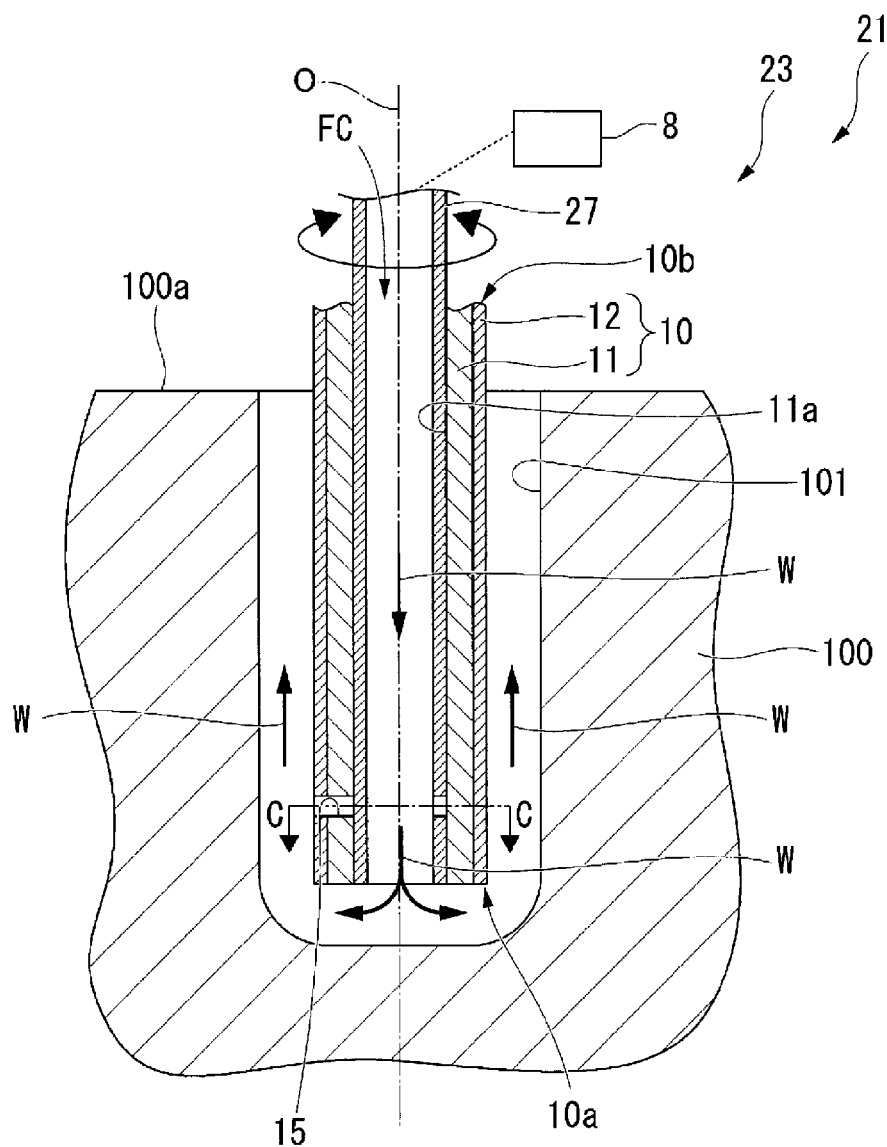
FIG. 5A is a vertical cross-sectional view illustrating an electrochemical machining tool and a machined material in an electrochemical machining system according to a second embodiment of the present invention, while the fluid outflow hole is closed.
Figure 5B:
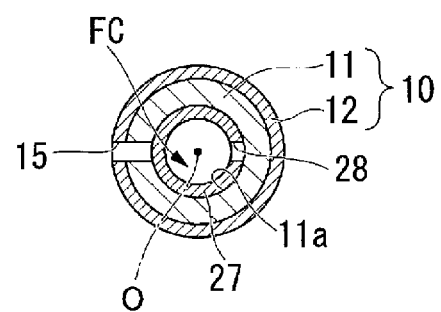
FIG. 5B is a cross-sectional view taken along line C-C of FIG. 5A, illustrating the closed fluid outflow hole in the electrochemical machining system according to the second embodiment of the present invention.

As illustrated in FIG. 5A and FIG. 5B, the electrochemical machining tool 23 is equipped with a tube-shaped member 27 (shielded portion) arranged at an inner side of the electrode 11, similarly to the first embodiment.

The tube-shaped member 27 has a tubular shape extending along the axial line O similarly to the electrode 11, and is formed from a material having flexibility, similarly to the tube-shaped member 17. The tube-shaped member 27 is provided inside the electrode 11, being co-axial with the electrode 11. The tube-shaped member 27 is rotationally displaced about a direction of the axial line O by the drive mechanism 8 while sliding with respect to the electrode 11 with an outer circumferential surface 27a of the tube-shaped member 27 being in a state of contact with the inner circumferential surface 11a of the electrode 11.

A through-hole 28 is formed in the tube-shaped member 27, passing through in the radial direction at the same position as the fluid outflow hole 15 along the direction of the axial line O.

In the present embodiment, the tube-shaped member 27 is arranged such that, in a state where the positions of the through-hole 28 and the fluid outflow hole 15 coincide along the direction of the axial line O, an end face on the tip 10a side of the tube-shaped member 27 and an end face on the tip 10a side of the tool body 10 are flush.

As a result, the tube-shaped member 27 performs relative rotation with respect to the electrode 11 in the direction of the axial line O inside the electrode 11, thereby selectively opening and closing the above-described fluid outflow hole 15.

Figure 6A:
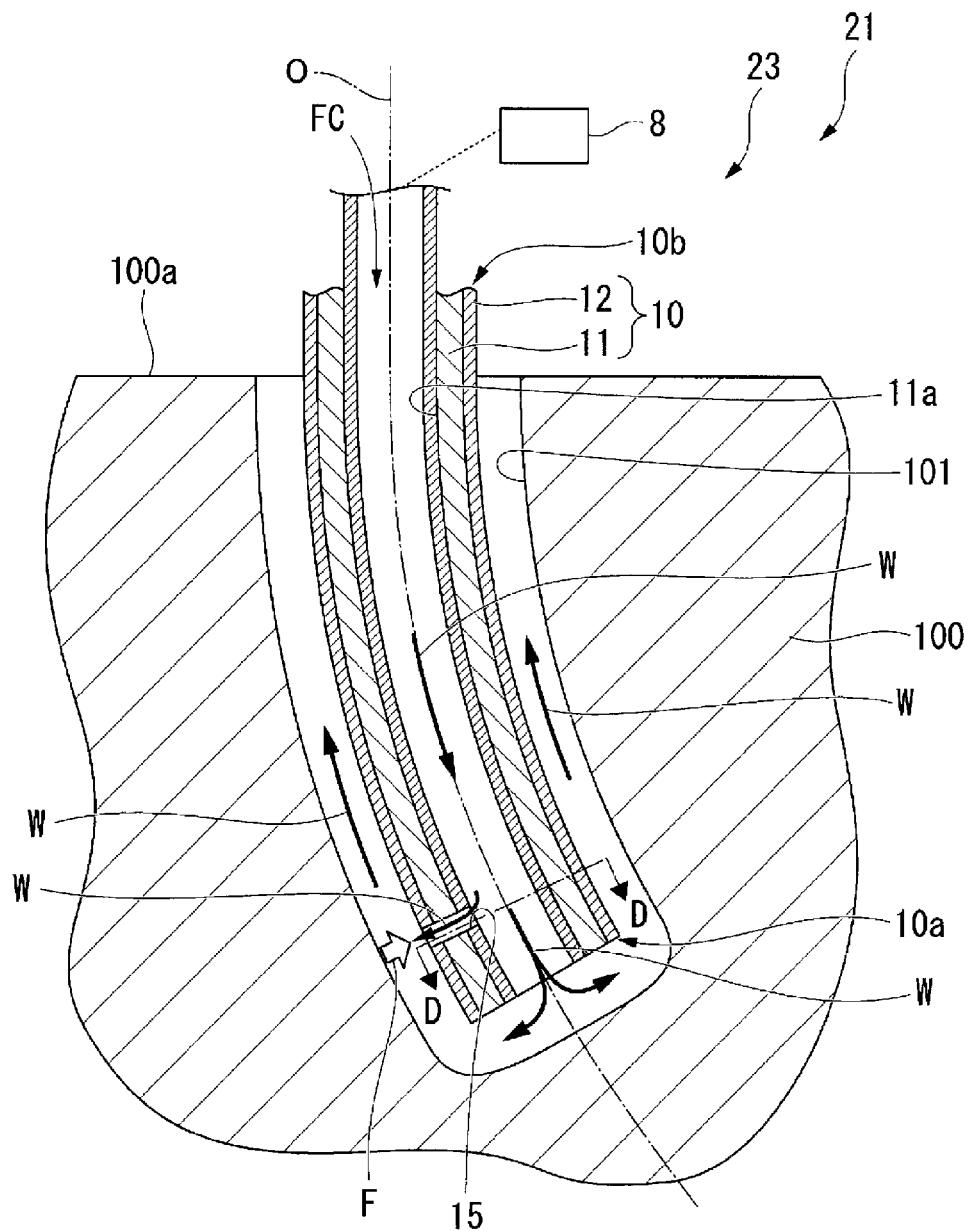
FIG. 6A is a vertical cross-sectional view illustrating the electrochemical machining tool and the machined material in the electrochemical machining system according to the second embodiment of the present invention, while the fluid outflow hole is opened.
Figure 6B:
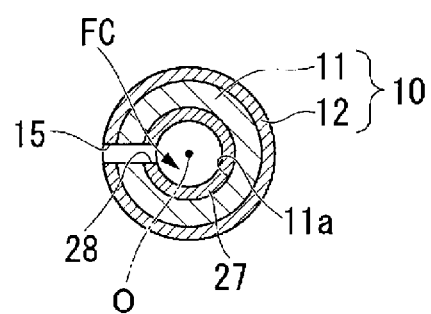
FIG. 6B is a cross-sectional view taken along line D-D of FIG. 6A, illustrating the opened fluid outflow hole in the electrochemical machining system according to the second embodiment of the present invention.

According to the electrochemical machining system 21 of the present embodiment, as illustrated in FIGS. 6A and 6B, the through-hole 28 and the fluid outflow hole 15 are made continuous by the rotation of the tube-shaped member 27. As such, the fluid outflow hole 15 is opened, thus enabling deflection deformation of the tool body 10. Conversely, as illustrated in FIG. 5A, the fluid outflow hole 15 may be closed by avoiding a continuous state of the through-hole 28 and the fluid outflow hole 15, by rotation of the tube-shaped member 27.

As a result, the deflection deformation of the tool body 10 may be easily controlled. As such, the electric current density distribution is adjusted, enabling easy formation of the machined hole 101 in a desired shape of a curved hole and a straight hole.

The tube-shaped member 27 need not be perfectly tubular. For example, the tube-shaped member 27 may be shaped as a spatula or the like, provided that the through-hole 28 and the fluid outflow hole 15 may at least be changed between continuous and non-continuous states.

The tube-shaped member 27 may also be provided on an outer side of the tool body 10 so as to cover the insulating layer 12 from the outer circumferential side.

Similarly to the first embodiment, the tube-shaped member 27 may also be made displaceable by the drive mechanism 8 along the direction of the axial line O. In such a situation, the closed surface area of an aperture portion of the fluid outflow hole 15 may be adjusted by adjusting the overlap in surface area between the fluid outflow hole 15 and the through-hole 28. Accordingly, the outflow volume of the electrolytic solution W from the fluid outflow hole 15 is adjustable. Thus, the amount of deflection deformation of the tool body 10 may be modified, which enables the machined hole 101 to be easily formed in a further complex shape.

Figure 7:
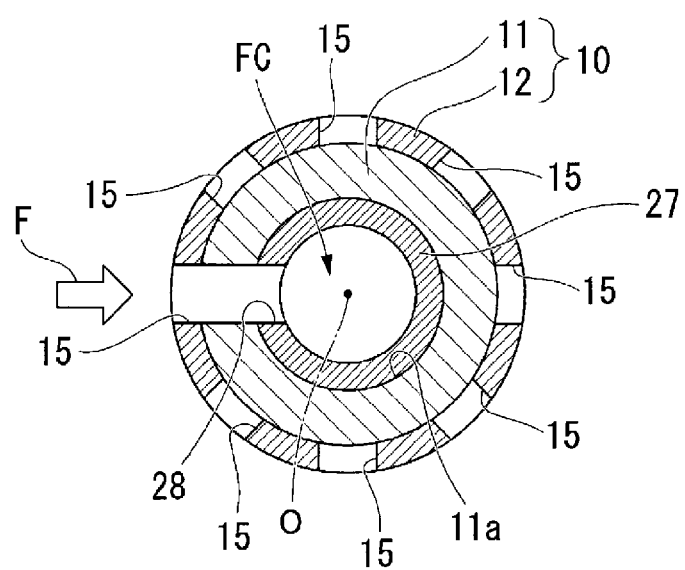
FIG. 7 is a view of the same cross-sectional position as FIG. 6B, illustrating the fluid outflow hole of a tool body in the electrochemical machining system according to a first modified example of the second embodiment of the present invention.

As illustrated in FIG. 7, the fluid outflow hole 15 may also be formed in plurality, with spacing along the circumferential direction of the tool body 10. In such a situation, the outflow direction of the electrolytic solution W may be adjusted by selecting the fluid outflow holes 15 that are closed. As such, the direction of the reaction force F applied to the tool body 10 from the inner face of the machined hole 101 is adjusted, thereby enabling the direction of the deflection deformation of the tool body 10 to be modified. Accordingly, the machined hole 101 may be easily formed in a more complex shape.

The fluid outflow hole 15 may also be formed in plurality along the circumferential direction, for example as long holes extending in the circumferential direction. Also, the through-hole 28 may be provided as a short hole that is shorter than the long holes in the circumferential direction. This enables the outflow direction of the electrolytic solution W to be modified in the circumferential direction.

In addition, similar to the illustration of FIG. 4, the fluid outflow hole 15 may also be formed in plurality, with spacing along the direction of the axial line O. In such a situation, similarly to the first embodiment, the tube-shaped member 27 is also displaceable by the drive mechanism 8 in the direction of the axial line O. Thus, the outflow volume of the electrolytic solution W is adjustable.

Furthermore, in such a situation, the deflection deformation of the tool body 10 may be produced by a small reaction force F while the fluid outflow hole 15 is opened on the tip 10a side. Conversely, opening the fluid outflow hole 15 on the base end 10b side enables the amount of deflection deformation of the tool body 10 to be made smaller with the same reaction force F, in comparison to a situation in which the fluid outflow hole 15 is opened on the tip 10a side. As a result, the deflection deformation of the tool body 10 may be controlled without changing the supplied amount of the electrolytic solution W.

The fluid outflow hole 15 need not be formed in plurality along the direction of the axial line O. For example, the fluid outflow hole 15 may be a long hole extending in the direction of the axial line O. Also, the through-hole 28 may be a short hole that is shorter than the long hole in the direction of the axial line O. As such, the outflow position of the electrolytic solution W may be changed in the direction of the axial line O. This enables the deflection deformation of the tool body 10 to be controlled without modifying the supplied amount of the electrolytic solution W.

Figure 8:
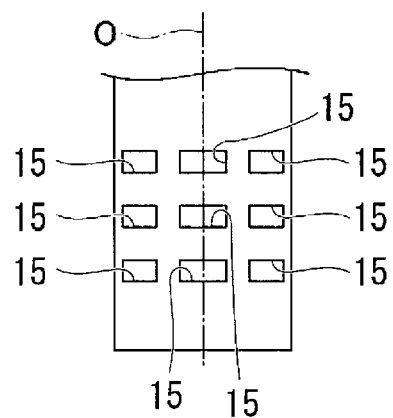
FIG. 8 is a view of the same position as FIG. 2C, illustrating the fluid outflow hole of the tool body in the electrochemical machining system according to a second modified example of the second embodiment of the present invention.

Furthermore, as illustrated in FIG. 8, the fluid outflow hole 15 may also be formed in plurality, with spacing along the direction of the axial line O and the circumferential direction. In such a situation, the outflow direction and the outflow volume of the electrolytic solution W may be adjusted simultaneously.

This fluid outflow hole 15 need not be formed in plurality along the direction of the axial line O and the circumferential direction. The fluid outflow hole 15 may also form a T-shape, an L-shape, and the like extending in the direction of the axial line O and in the circumferential direction, resembling connected fluid outflow holes 15. In addition, long holes extending along the direction of the axial line O and the circumferential direction may also be provided. Also, the through-hole 28 may be a short hole that is shorter than this fluid outflow hole 15 in the direction of the axial line O and the circumferential direction. As such, the outflow direction of the electrolytic solution W may be changed in the circumferential direction. This also enables the deflection deformation of the tool body 10 to be controlled without modifying the supplied amount of the electrolytic solution W.

Third Embodiment

An electrochemical machining system 31 according to a third embodiment of the present invention is described next.

Components common to the first embodiment are given the same reference signs, and detailed explanation thereof is omitted.

In this embodiment, an electrochemical machining tool 33 differs from the first embodiment.

Figure 9A:
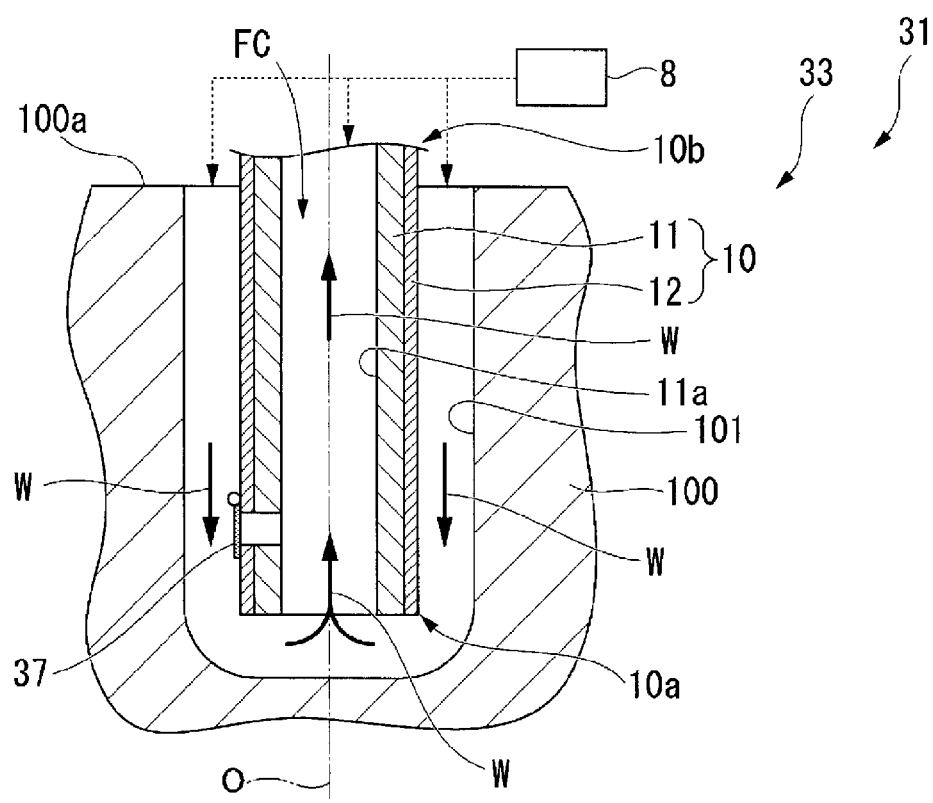
FIG. 9A is a vertical cross-sectional view of an electrochemical machining tool and a machined material in an electrochemical machining system according to a third embodiment of the present invention, while a fluid outflow hole is closed.
Figure 9B:
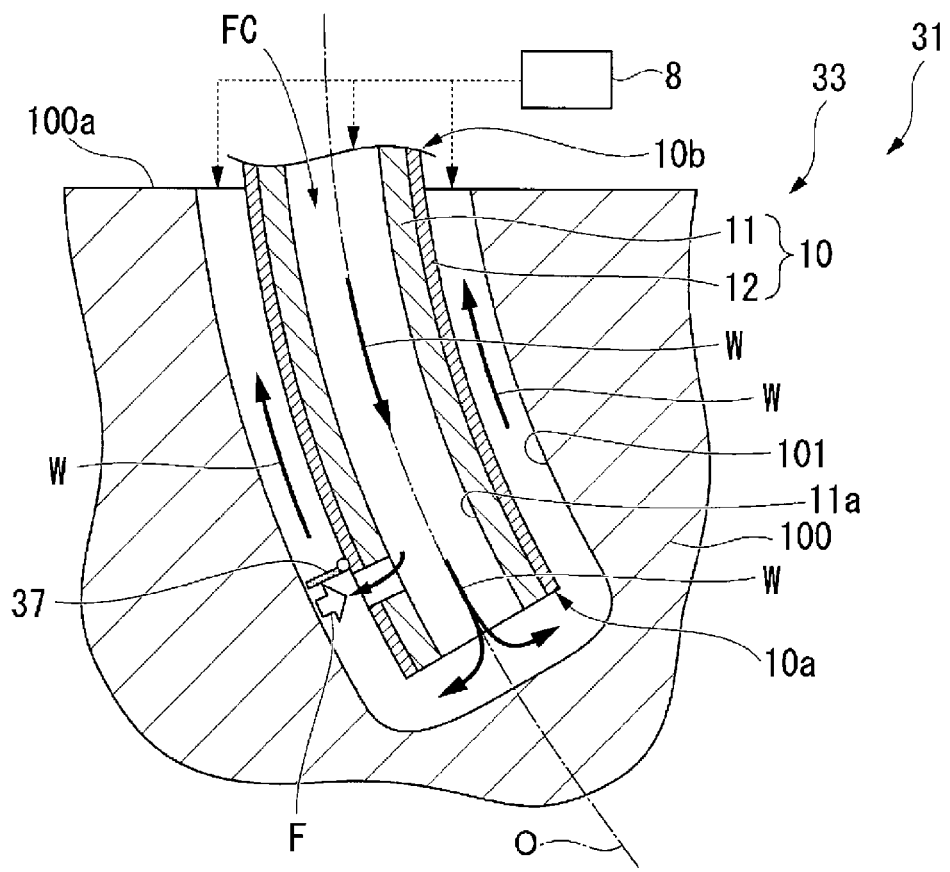
FIG. 9B is a vertical cross-sectional view illustrating the electrochemical machining tool and the machined material in the electrochemical machining system according to the third embodiment of the present invention, while the fluid outflow hole is opened.

As illustrated in FIGS. 9A and 9B, the electrochemical machining tool 33 is equipped with a lid member 37 (shielded portion) provided above the fluid outflow hole 15 on the outer circumferential side of the tool body 10. The lid member 37 is capable of rotation using a direction along the circumferential direction of the tool body 10 as an axis of rotation, so as to open and close the aperture portion of the fluid outflow hole 15.

In the present embodiment, the drive mechanism 8 is a device selecting whether to supply the electrolytic solution W from the outer circumferential side of the tool body 10, or to supply the electrolytic solution W to the flow channel FC.

According to the electrochemical machining system 31 of the present embodiment, as illustrated in FIG. 9B, the electrolytic solution W is supplied to the flow channel FC by the drive mechanism 8. As such, the electrolytic solution W presses the lid member 37 up toward the outer circumferential side, such that the fluid outflow hole 15 is opened and the electrolytic solution W flows out from the fluid outflow hole 15. Accordingly, this enables deflection deformation of the tool body 10. Conversely, as illustrated in FIG. 9A, the electrolytic solution W is supplied between the tool body 10 and the inner surface of the machined hole 101 by the drive mechanism 8. As such, the lid member 37 is pressed against the outer circumferential surface of the tool body 10, which enables closing of the fluid outflow hole 15.

As a result, the deflection deformation of the tool body 10 may be easily controlled. As such, the electric current density distribution is adjusted, enabling easy formation of the machined hole 101 in a desired shape of a curved hole and a straight hole.

Here, the drive mechanism 8 need not be a device selecting a supply position of the electrolytic solution W, but may also be a device controlling the flow volume while supplying the electrolytic solution W to the flow channel FC. In such a situation, the lid member 37 is capable of opening and closing the fluid outflow hole 15 by being made to open upon a fixed flow volume of the electrolytic solution W being supplied to the flow channel FC.

In addition, the drive mechanism 8 need not be a device driving the opening and closing of the lid member 37 by changing the supply position of the electrolytic solution W, but may also be a drive device directly driving the opening and closing of the lid member 37. In such a situation, the lid member 37 may be provided over the inner circumferential surface 11a of the electrode 11 and perform opening and closing of the aperture portion of the fluid outflow hole 15.

The embodiments of the present invention have been described above in detail. However, various design modifications are possible without deviating from the technical idea of the present invention.

INDUSTRIAL APPLICABILITY

According to the above-described electrochemical machining tool and electrochemical machining system, a machined hole may be easily formed in a desired shape of a curved hole and a straight hole by opening and closing a fluid outflow hole using a shielded portion.

REFERENCE SIGNS LIST

1 Electrochemical machining system
3 Electrochemical machining tool
4 Tool displacement mechanism
4a Gripper
5 Guide
5a Guide hole
6 Electrolytic solution supplier
6a Electrolytic solution flow channel
8 Drive mechanism (Shielded portion drive mechanism)
10 Tool body
10a Tip
10b Base end
11 Electrode
11a Inner circumferential surface
12 Insulating layer
15 Fluid outflow hole
17 Tube-shaped member (Shielded portion)
17a Outer circumferential surface
21 Electrochemical machining system
23 Electrochemical machining tool
27 Tube-shaped member (Shielded portion)
27a Outer circumferential surface
28 Through-hole
31 Electrochemical machining system
33 Electrochemical machining tool
37 Lid member (Shielded portion)
100 Machined material
100a Tip
101 Machined hole
O Axial line
W Electrolytic solution
FC Flow channel
F Reaction force

The invention claimed is:

1. An electrochemical machining tool, comprising:
a tool body including: an electrode made from an electrically conductive material in a cylindrical shape extending along an axial line and having flexibility, an electrolytic solution flowing in the electrode toward a tip side; and an insulating layer coated on an outer circumferential face of the electrode so as to expose the tip of the electrode,
a fluid outflow hole being formed in the tool body, passing through the tool body in a radial direction and guiding the electrolytic solution flowing in the electrode outward in the radial direction, and
the electrochemical machining tool further comprising a shielded portion selectively opening and closing the fluid outflow hole.

2. The electrochemical machining tool according to claim 1, wherein
the shielded portion is a tube-shaped member having a tube shape extending along the axial line and having flexibility, and is provided so as to be capable of relative displacement in the direction of the axial line with respect to the electrode while an outer circumferential surface of the shielded portion is in a state of contact with an inner circumferential surface of the electrode.

3. The electrochemical machining tool according to claim 2, wherein
the fluid outflow hole is formed in plurality on the tool body, with spacing in the direction of the axial line.

4. The electrochemical machining tool according to claim 1, wherein
the shielded portion is a tube-shaped member having a tube shape extending along the axial line and having flexibility, is provided so as to be capable of relative rotation about the axial line with respect to the electrode while an outer circumferential surface of the shielded portion is in a state of contact with an inner circumferential surface of the electrode, and has a through-hole formed therein at the same position as the fluid outflow hole in the direction of the axial line, passing through in the radial direction.

5. The electrochemical machining tool according to claim 4, wherein
the fluid outflow hole is formed in plurality on the tool body, with spacing in a circumferential direction of the tool body.

6. The electrochemical machining tool according to claim 4, wherein
the shielded portion is provided so as to be capable of relative displacement in the direction of the axial line with respect to the electrode.

7. The electrochemical machining tool according to claim 6, wherein
the fluid outflow hole is formed in plurality on the tool body, with spacing in the direction of the axial line.

8. The electrochemical machining tool according to claim 1, wherein
the shielded portion is a lid member provided on an outer circumferential side of the tool body, and opens and closes the fluid outflow hole.

9. The electrochemical machining tool according to one of claim 5, wherein
the shielded portion is provided so as to be capable of relative displacement in the direction of the axial line with respect to the electrode.

10. The electrochemical machining tool according to claim 9, wherein
the fluid outflow hole is formed in plurality on the tool body, with spacing in the direction of the axial line.

11. An electrochemical machining system, comprising:
the electrochemical machining tool according to claim 1;
a guide guiding the electrochemical machining tool in a predetermined advancement direction with respect to a machined material;
a tool displacement mechanism causing the electrochemical machining tool to advance; and
a shielded portion drive mechanism operating the shielded portion to open and close the fluid outflow hole.

* * * * *